Jan. 2, 1951　　　　W. L. BOETTGER　　　　2,536,532
WAGON BOX ATTACHMENT FOR ENDGATE SEEDERS
Filed Nov. 14, 1949
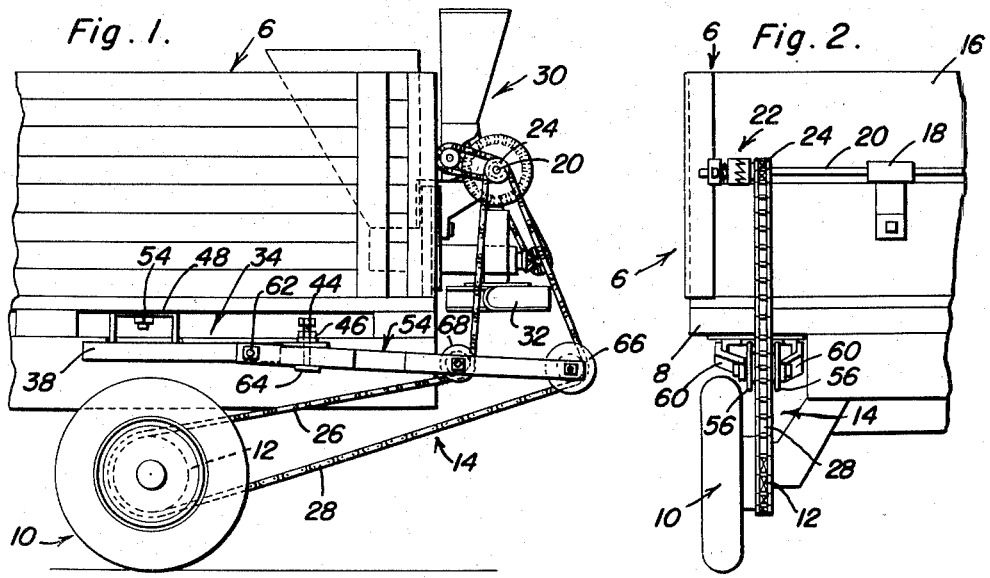
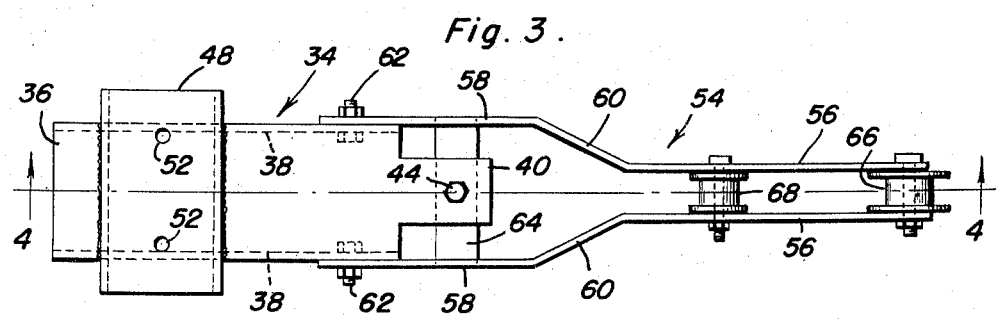
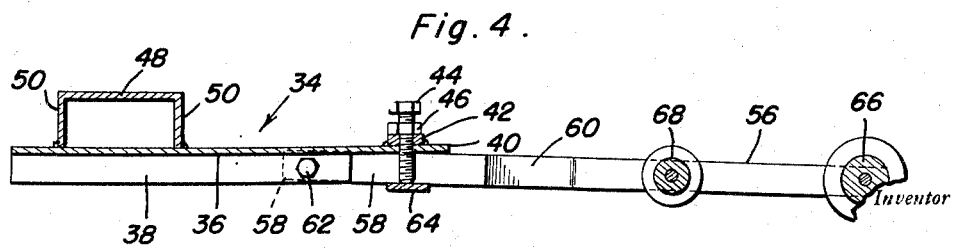
Walter L. Boettger
By *Clarence A. O'Brien and Harvey B. Jacobson*
Attorneys Patented Jan. 2, 1951

2,536,532

UNITED STATES PATENT OFFICE 2,536,532

WAGON-BOX ATTACHMENT FOR ENDGATE SEEDERS

Walter L. Boettger, Shelby, Iowa

Application November 14, 1949, Serial No. 126,972

4 Claims. (Cl. 74—240)

The present invention relates to a novel and improved device, which takes the form of a so-called attachment which is applicable to the under side of the platform portion of a wagon box and provided with idlers projecting rearwardly beyond the wagon box in a manner to accommodate an endless sprocket chain, the latter being employed to deliver power from a ground-engaging wheel to a conventional-type end gate seeder.

End gate seeders are of course not so standardized that they are limited to one or two different makes. However, the present invention is not particularly concerned with the exact kind or type of seeder which is employed. The difficulty is that end gate seeders which have been for some time properly applicable to relatively narrow wagon boxes with flaring longitudinal side walls cannot be successfully used on the wide and flat bottomed wagon box which is currently in use and wherein the wheels are directly underneath of the platform instead of in positions spaced outwardly from the flaring side walls.

There has existed for some time the problem of providing a simple and economical device for properly supporting and guiding the commonly used sprocket chain in order to deliver power from the ground wheel to the driven shaft of the end gate seeder without having to alter the details of construction of the seeder. The present invention, therefore, has reference to a conversion-type attachment which lends itself admirably well to attachment to the wagon box and which is such that it positions the sprocket chain and properly delivers the wanted power from the coacting ground wheel beneath the wagon box, to the driven shaft of the seeder.

In carrying out the principles of the invention and adopting a preferred embodiment of same, a structure has been devised in which manufacturers, sellers and users will find their expected needs and requirements fully met, contained and effectively available.

Briefly summarized, the attachment is characterized by an adapter bracket or fixture which is bolted underneath of the platform of the wagon body just above the usual sprocket-equipped rear wheel of the wagon. An extension frame is hingedly and adjustably bolted to the rear end of a part of the adapter means and is provided with primary and secondary chain guiding idlers or pulleys.

Other objects and advantages will become more readily apparent from the following description and the accompanying illustrative drawings.

In the accompanying sheet of drawings, wherein like numerals are employed to designate like parts throughout the same:

Figure 1 is a fragmentary elevational view of the rear end portion of a so-called wide bottomed wagon body with the wheels directly beneath the platform, with the seeder applied for use and with the idler attachment in place;

Figure 2 is a rear end elevation of the structure shown in Figure 1;

Figure 3 is a top plan view of the attachment per se, that is, minus the sprocket chain and wholly detached from the wagon body; and Figure 4 is a central longitudinal sectional view taken approximately on the central line 4—4 of Figure 3, looking in the direction of the arrows.

Referring now to Figures 1 and 2, the wagon body is denoted by the numeral 6 and the base or platform thereof is denoted at 8, and beneath this is the usual rubber-tired ground or traction wheel 10, the same being provided with a sprocket wheel 12 driving the sprocket chain 14. In Fig. 2, the end gate is denoted at 16 and has bearing brackets 18 supporting the driven shaft 20, the latter provided with clutch means 22 and a small sprocket 24 to accommodate the sprocket chain. The advancing and returning runs of the sprocket chain are denoted by the numerals 26 and 28. The numeral 30 designates a hopper of the end gate seeder, and 32 denotes the scattering means for the seeds.

The attachment, as brought out better in Figure 3, comprises an adapter fixture 34 which is a longitudinally elongated channel member having a web portion 36 and side flanges 38—38. The web has an extending tongue 40 at the forward end carrying a mount 42 for a set screw 44 and lock nut 46. There is a transverse channel member 48 provided and this has its flanges 50—50 welded to the web portion of the web 36, bolt holes being provided at 52—52 to accommodate bolt means 54 which are employed in bolting said channel member to the under side of the platform 8, as illustrated in Figures 1 and 2.

The extension frame means is denoted by the numeral 54 and embodies a pair of duplicate frame members. The rearward end portions 56—56 are close together and in spaced parallelism. The forward end portions 58 are also in spaced parallelism and are joined to portions 56 by way of rearwardly converging portions 60—60. Portions 58 straddle the rearward end portion of the channel member 34 and are adjustably and hingedly bolted to the flanges 38 as at 62—62. There is a cross-piece 64 (see Figs. 3 and 4) on the limbs or frame members 58—58 to accommodate the set screw and to permit the frame unit to be conveniently adjusted. The frame unit is provided with freely rotatable, suitably flanged idlers or pulleys, the rear one being the main pulley for the run 28 and being denoted by the numeral 66, and the remaining one being smaller and denoted by the numeral 68 and serving to take care of the return run 26.

The flat bottomed, wide ranging wagon is old and it is also old to derive power from a ground-engaging wheel and to transmit it by sprocket chain to an end gate seeder on such a body. Therefore, the factor of novelty is directed to the device or means depicted in particular in Figures 3 and 4 of the drawings.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A sprocket chain accommodating wagon body attachment of the class shown and described comprising an elongated inverted channel-shaped member adapted to underlie the bottom of the wagon body in spaced parallelism, a second inverted channel-shaped member superimposed upon and rigidly connected to the web portion of the first-named channel member and adapted to be bolted directly to the bottom of the wagon body, a frame unit provided with spaced idlers and including spaced frame members having forward ends straddling and hingedly bolted to a rearward end portion of said first-named channel member.

2. A sprocket chain accommodating wagon body attachment of the class shown and described comprising an elongated inverted channel-shaped member adapted to underlie the bottom of the wagon body in spaced parallelism, a second inverted channel-shaped member superimposed upon and rigidly connected to the web portion of the first-named channel member and adapted to be bolted directly to the bottom of the wagon body, a frame unit provided with spaced idlers and including spaced frame members having forward ends straddling and hingedly bolted to a rearward end portion of said first-named channel member, and provided with a cross-piece, the rear end of said first-named channel-shaped member having an extending tongue overlying said cross-piece and provided with a set screw, said set screw being engageable with said cross-piece.

3. An attachment for a wide-bodied, flat-bottomed farm wagon of the class shown and described, comprising an extension frame, said frame having a pair of spaced opposed duplicate frame members, the rearward ends of said frame members being in close spaced parallelism and being provided between themselves with longitudinally spaced sprocket chain idlers, the forward ends of said members being in relatively wide spaced parallelism and provided with a rigid cross-piece and attaching bolts, the intermediate portions of said members converging rearwardly and serving to join said forward and rearward portions in proper relationship, and an adapter fixture for mounting the extension frame on the bottom of the wagon body.

4. A sprocket chain accommodating wagon body attachment of the class shown and described comprising an elongated member adapted to underlie the bottom of the wagon body in spaced parallelism, a second member superimposed upon and rigidly connected to the web portion of the first-named member and adapted to be bolted directly to the bottom of the wagon body, a frame unit provided with spaced idlers and including spaced frame members having forward ends straddling and hingedly bolted to a rearward end portion of said first-named member, and provided with a cross-piece, the rear end of said first-named member having an extending tongue overlying said cross-piece and provided with a set screw, said set screw being engageable with said cross-piece.

WALTER L. BOETTGER.

REFERENCES CITED

The following references are of record in the file of this patent:

UNITED STATES PATENTS

| Number | Name | Date |
|---|---|---|
| 196,250 | Reynolds | Oct. 16, 1877 |
| 296,099 | Zastrow | Apr. 1, 1884 |
| 1,394,705 | Barton | Oct. 25, 1921 |